United States Patent [19]
Abbe et al.

[11] 3,837,065
[45] Sept. 24, 1974

[54] METHOD OF SEMI-AUTOMATIC ENCAPSULATION AND A SEMI-AUTOMATIC ENCAPSULATING APPARATUS

[75] Inventors: Lucien Abbe, Issy Les Moultneaux; Jean Michel Eschbach, Enghten Les Bains; Roland Letang, Chennevieres sur Marne; Charles Sachs, Paris, all of France

[73] Assignee: Commissariat a l'Energie Atomique, Paris, France

[22] Filed: Oct. 31, 1972

[21] Appl. No.: 302,491

[30] Foreign Application Priority Data
Nov. 18, 1971 France .............................. 71.41286

[52] U.S. Cl. ............... 29/429, 29/200 R, 29/208 F, 53/35, 53/250
[51] Int. Cl. ....................... B23p 11/00, B23p 19/00
[58] Field of Search ...... 29/429, 428, 200 R, 208 F, 29/208 B; 53/35, 250

[56] References Cited
UNITED STATES PATENTS
3,475,805  11/1969  Rottmann .......................... 29/208 F FOREIGN PATENTS OR APPLICATIONS
1,545,686  10/1968  France
2,063,695  6/1971  France
721,908  11/1965  Canada ............................ 29/200 R
1,205,371  9/1970  Great Britain

*Primary Examiner*—Charles W. Lanham
*Assistant Examiner*—D. C. Crane
*Attorney, Agent, or Firm*—Cameron, Kerkham, Sutton, Stowell & Stowell

[57] ABSTRACT

A first circular turntable is provided with recesses for accommodating ten vessels to be encapsulated and with peripheral slots, the slots and recesses being uniformly spaced in alternate sequence. A slide containing a pellet-loading magazine is placed beneath the edge of the turntable in vertical alignment with a sucking tube carried by a supporting-arm which is driven in reciprocating motion.

The sucking tube is moved downwards to its bottom position and draws a pellet upwards from the magazine through a slot. At the same time, the turntable is caused to rotate through an angular interval of 18°, the tube returns downwards the suction is cut-off and the pellet drops into the corresponding vessel.

After one complete revolution, a second turntable provided with holes in which are placed ten deflecting spacer screens is placed on the first turntable and locked in position. By rotating an annular diaphragm having corresponding holes, the ten screens are released and fall into the ten vessels of the first turntable, said vessels being finally sealed by end-caps.

10 Claims, 4 Drawing Figures

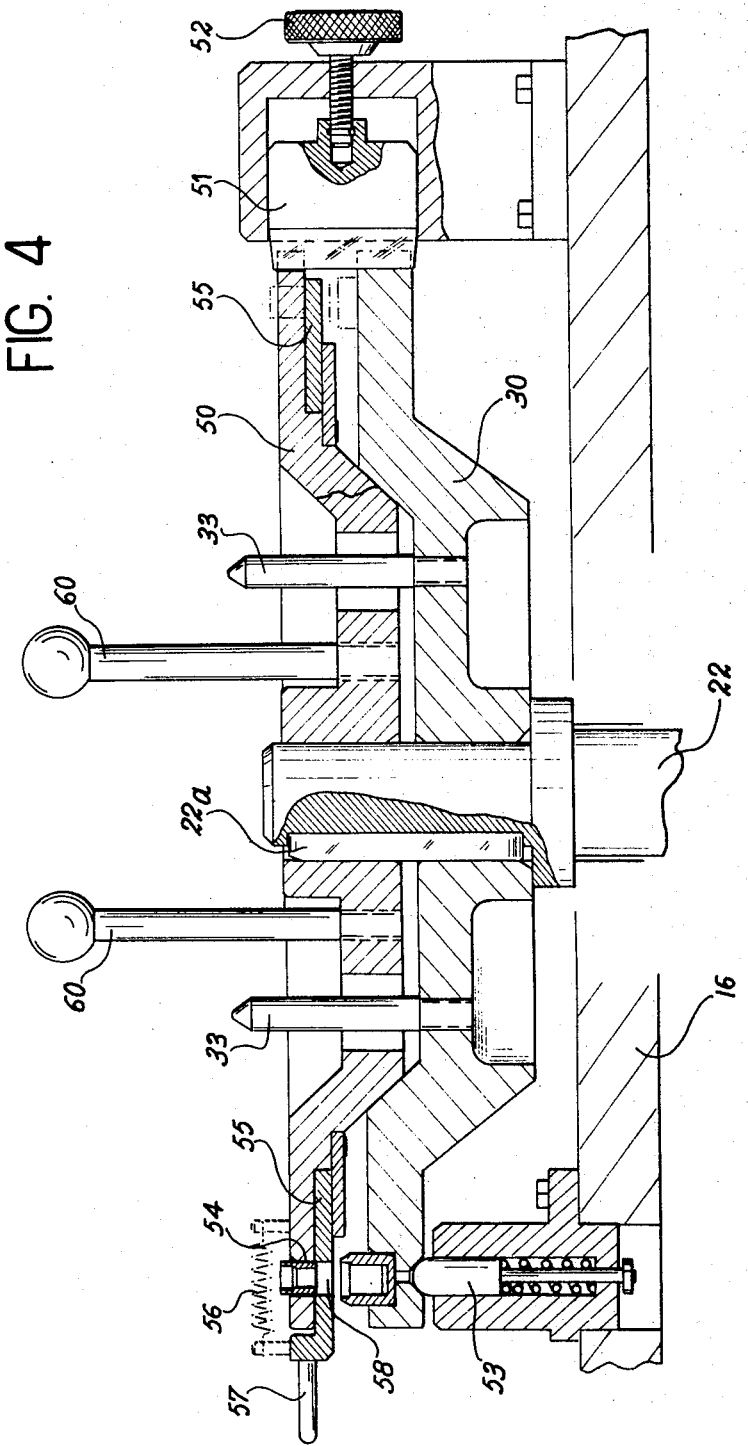

METHOD OF SEMI-AUTOMATIC ENCAPSULATION AND A SEMI-AUTOMATIC ENCAPSULATING APPARATUS

This invention relates to a method of semi-automatic encapsulation and to a semi-automatic encapsulating apparatus.

The numerous applications which arise from the technological use of nuclear substances frequently present fabrication problems which, although of a usual type in conventional techniques, call for special solutions which are adapted to the nature of these nuclear substances.

The invention is concerned with the heart pacemakers which employ sources of plutonium-238 alloy. Each source is constituted by a small cylindrical vessel at the bottom of which is placed a pellet of plutonium alloy surmounted by a deflecting spacer screen, the vessel being closed by a welded end-cap.

At the time of fabrication of said vessels, it is advisable to prevent any contamination of the surface of the plutonium alloy during handling operations and also to ensure that there is no possibility of contamination either of the vessels themselves or of the equipment; moreover, by reason of the oxidisability of plutonium and the production of helium, the number of vessels to be fabricated at the same time must be chosen in such manner that the sealing of all said vessels should take place within a predetermined time interval.

The present invention makes it possible to carry out the encapsulation of the vessels, that is to say the positioning of the pellets and of the deflecting spacer screens, in such a manner as to ensure compliance with the above requirements.

More precisely, the invention is directed to a method of semi-automatic encapsulation of vessels, said method being characterized in that it consists:

in a first stage, in arranging in line on a movable track and in alternate sequence predetermined number of vessels and a corresponding number of slots of said track with a constant angular interval between any one vessel and an adjacent slot, then in displacing the line of vessels and slots in step-by-step motion above a loading magazine which contains the pellets, in withdrawing and lifting a pellet above said track by means of a movable sucking tube as a slot passes above the loading magazine, then in lowering the sucking tube and cutting-off the suction above the vessel which immediately follows the slot so that the withdrawn pellet should fall to the bottom of the vessel and so on in sequence in the case of the different vessels;

in a second stage, in positioning on the first track which has been secured against rotation a second track adapted to support deflecting spacer screens within holes which are obturated by a diaphragm and spaced at the same angular intervals as the vessels on the first track, the position of the two tracks being such that each deflecting spacer screen is located vertically above a vessel and the deflecting spacer screens can thus be encapsulated simultaneously within the different vessels by manual control of the diaphragm opening.

The invention is also directed to a semi-automatic apparatus for the application of said method, said apparatus being essentially characterized in that it comprises two turntables, namely a first circular turntable which is capable of rotating about its axis and constitutes the movable track, the slots being notches of substantial depth uniformly spaced on the periphery of said turntable, the movement of the turntable and the movement of the vertically movable sucking tube being synchronized by a kinematic chain with eccentric which drives a vertical arm equipped with the sucking tube, a pin being fixed on each radius of the turntable which terminates in a vessel and said pin being adapted to initiate closure of the suction obturator which accompanies the sucking tube during the vertical movements thereof, and a second circular turntable which constitutes the second track and is positioned axially on the first turntable with a locking system, the diaphragm which is also of circular shape being capable of pivotal motion to the open position as a result of displacement of a radial operating lever which acts in opposition to a restoring spring.

Further characteristic features and advantages of this invention will become apparent from the following description in which one embodiment of the machine according to the invention is given by way of explanation without any limitation being implied, reference being made to the accompanying drawings, wherein:

FIG. 4 is a sectional view taken along the plane IV—IV of FIG. 3.

Figure 1:
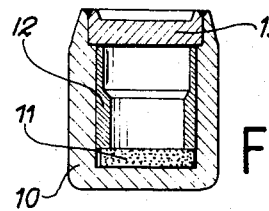
FIG. 1 is a sectional view of a plutonium-238 alloy source for a heart pacemaker.

As shown in FIG. 1, each plutonium alloy source for a heart pacemaker is formed of a small cylindrical vessel 10, a pellet 11 of said alloy which rests on the bottom of said vessel, and a deflecting spacer screen 12 which is placed on said pellet; the vessel is sealed by an end-cap 13 which is welded by the electronic beam technique.

Figure 2:
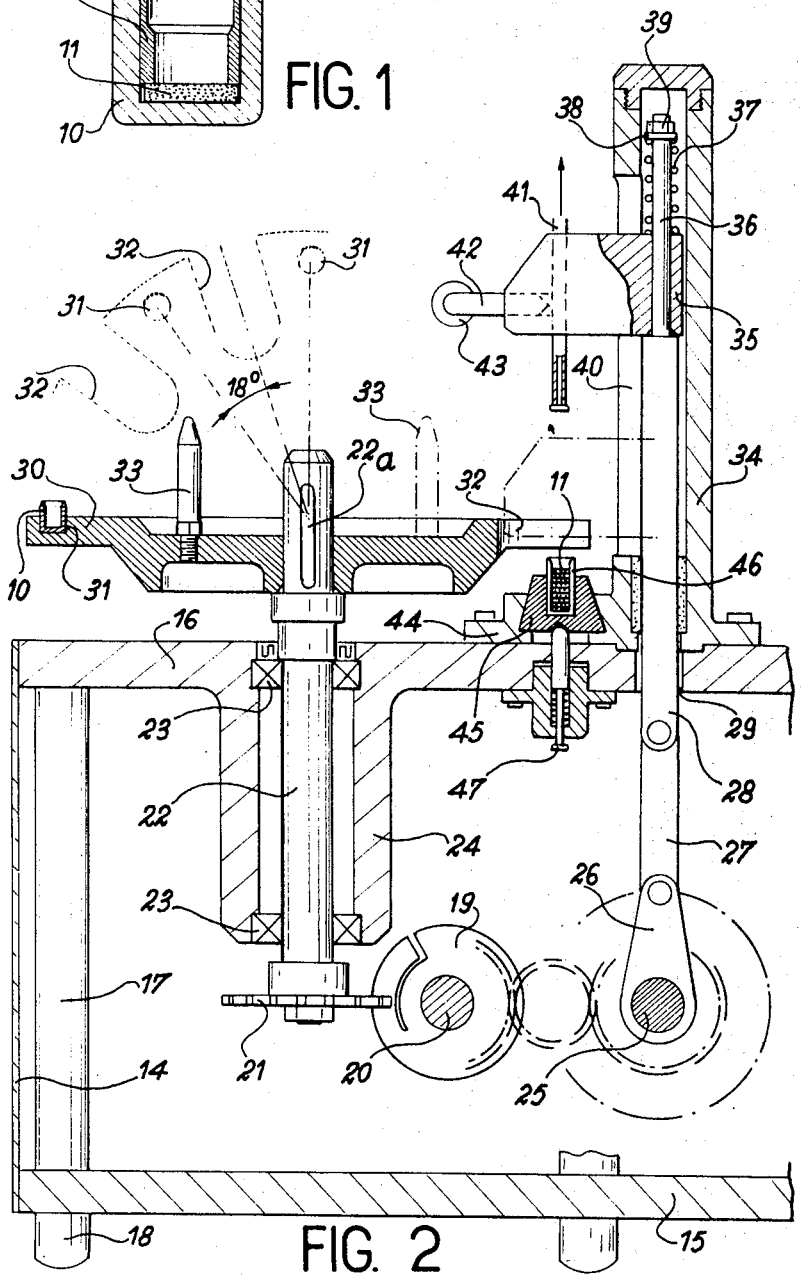
FIG. 2 is a view of the apparatus in part-sectional front elevation showing the first turntable with the device for transferring plutonium alloy pellets by suction.
Figure 3:
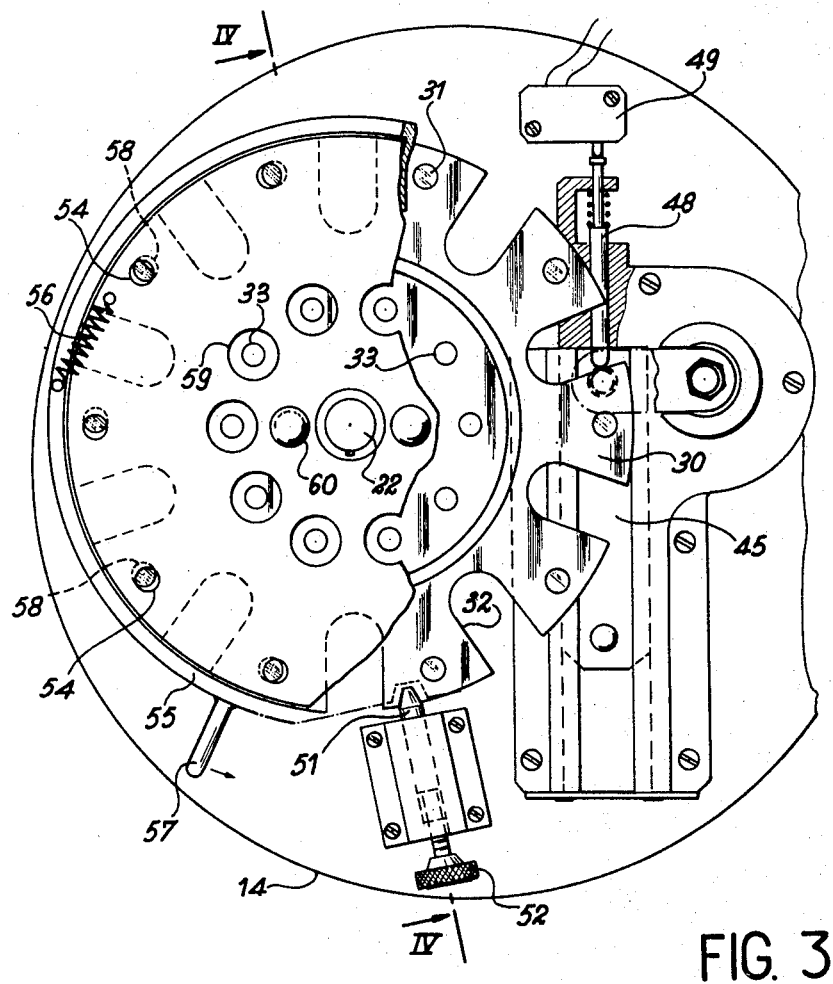
FIG. 3 is a top view showing the apparatus which is equipped with its two turntables, the turntable which carries the deflecting spacer screens being shown only partially.

The apparatus shown in FIGS. 2 to 4 has been designed for the encapsulation of ten of said vessels in a single operation.

From FIG. 2, it is seen that the complete apparatus is supported by a frame constituted by a cylindrical casing 14 and base-plate 15; the casing is closed by a mounting-plate 16 resting on columns 17 which terminate beneath the base-plate in nipples 18 for supporting the apparatus on the ground.

Provision is made within the frame as thus constituted for a motor having a horizontal axis (not shown in the drawings) which drives a kinematic transmission chain comprising in particular a step-motion cam 19 mounted on the driving shaft 20; said cam drives a notched wheel 21 at the lower extremity of a vertical spindle 22 which extends above the mounting-plate through the bearings 23 carried by the sleeve 24 which is integral with said mounting-plate.

The kinematic chain also transmits motion to a horizontal shaft 25 on which is pivotally mounted a crank 26 with crank-arm 27 forming an eccentric so as to impart an alternating movement to a connecting-arm 28 which is capable of sliding vertically through the opening 29 of the mounting-plate.

The movements of the shaft 22 and of the connecting-arm 29 are carried out in accordance with cycles which will be described in detail hereinafter.

Above the mounting-plate 16, a circular turntable 30 having the shape of a shallow dish is mounted and locked on the shaft by means of the key 22a; ten recesses 31 are formed in said dish and uniformly spaced at the periphery of the turntable, each of said recesses being intended to accommodate one empty vessel 10 which projects to a small distance above the turntable; between each recess and the following recess, the edge of the dish is cut-out to form a slot 32 of substantial depth and, as shown in plan and in dashed lines in FIG. 2 (see also FIG. 3), the slots and recesses are uniformly arranged in alternate sequence and angularly displaced with a pitch of 18°. Finally, a vertical stud 33 having a conical head is screwed into the bottom of the dish on each radius which terminates in a recess 31, approximately at one-half the distance between the spindle 22 and said recess.

The mounting-plate 16 also supports laterally with respect to the turntable a vertical bracket 34 within which the connecting-arm 28 is slidably mounted; this latter terminates in a cantilevered supporting-arm 35 which is capable of sliding in a compensating piston movement along the rod 36 which forms an extension of the connecting-arm 28 within the vertical support bracket, while compressing a restoring spring 37 which is locked at the upper extremity of the rod 36 by means of a cup 38 and a nut 39.

The supporting-arm 35 is driven in the vertical reciprocating movement of the connecting-arm 28 along the slot 40 of the vertical support bracket 34; said supporting-arm is traversed by a vertical sucking tube 41 in which the suction can be cut-off by means of an obturator 42, the stem of which is subjected to the action of a spring (not shown) and carries at its extremity a control wheel 43.

A slide 45 containing a loading magazine 46 which is intended to receive the ten pellets 11 to be encapsulated within the different vessels is engaged in a dovetail assembly within the base 44 which serves to fix the support bracket 34 on the mounting-plate 16, and beneath the edge of the dish of the turntable 30. At the time of positioning, said slide is retained by means of a vertical spring-loaded stud 47 which penetrates into a small hollowed-out portion formed in the bottom of the slide. In this position, the loading magazine 46 is accurately located in vertical alignment with the sucking tube 41. As shown in FIG. 3, the slide produces action by means of a spring-loaded lateral rod 48 controlled by the magazine on a switch 49 which accordingly permits operation of the apparatus.

The second removable turntable 50 with which the apparatus is fitted can be seen in FIGS. 3 and 4; this turntable is also engaged on the spindle 22 by means of the positioning key 22a. Provision is made in the turntable for holes 59 through which the different pins 33 of the first turntable are permitted to extend. Correct positioning of the second turntable is ensured by means of a vertical spring-loaded stud 53 which is adapted to engage within a corresponding hollowed-out portion formed beneath the edge of the dish of the turntable 30 (as shown in FiG. 4). At this moment, it is possible on the opposite side to interlock the two turntables by means of the latch 51 and locking-screw 52.

The second turntable 50 is provided with ten holes 54 which are uniformly spaced on its circumference and intended to receive the deflecting spacer screens 12 at the time of the encapsulation operation; when said turntable has been correctly placed in position as indicated in the foregoing, each hole 54 is accurately located in vertically overhead relation to a vessel of the first turntable 30, and said holes 54 are accordingly shut-off at least partially by an annular diaphragm 55 which is located beneath the turntable and maintained by a spring 56 in the position of closure. Said diaphragm is provided on the edge thereof with a lateral operating lever 57. By displacing said operating lever over a short distance in the direction of the arrow, the spring 56 is stretched and the holes 54 are thus uncovered as each hole 58 of the diaphragm is placed in register with the bottom orifice of each of the aforesaid holes 54.

The operation of the apparatus in accordance with the invention is as follows:

It is assumed that the turntable 30 is alone in position and that an empty vessel 10 is inserted in each of the ten recesses 31 of the turntable; after placing within the slide 45 a loading magazine 46 which contains a stack of ten pellets 11, said slide is displaced to its work position as explained earlier. At this moment, the magazine is centered beneath a slot 32 in vertical alignment with the sucking tube 41 which is in the top position (as shown in FIG. 2).

The switch 49 having thus been actuated so as to permit operation of the apparatus, the motor is started-up. The supporting-arm 35 moves downwards until the sucking tube reaches its bottom position, draws a pellet through the slot from the loading magazine 46, then moves upwards to the full distance of travel before starting another downward movement; but during this time, the kinematic chain has caused the turntable 30 to rotate through the angular interval of 18° and said turntable stops momentarily; then, as the sucking tube returns downwards, the control wheel 43 which comes into contact with a pin 33 is displaced towards the right and the suction is cut-off by the obturator 42 at the moment when the sucking tube arrives within the first corresponding vessel and the pellet falls into this latter. The sucking tube returns upwards, the suction resumes whilst the turntable again rotates through an angular interval of 18° and the cycle described above begins again.

The bottom limit of travel of the sucking tube corresponds to withdrawal of the last pellet and the level to be attained at each withdrawal of a pellet by the sucking tube is automatically reached by the compensating system of the spring 37 which expands to a greater or lesser extent according to the level of the pellet to be withdrawn.

When the turntable has completed a full revolution, each vessel is loaded with one pellet to be encapsulated and the motor is stopped.

The second turntable 50 is then loaded with 10 deflecting spacer screens within the holes 54 which are obturated by the diaphragm; the turntable is held by the handles 60, placed on the first turntable and locked in position as described earlier. By displacing the operating lever 57, the 10 deflecting spacer screens fall into the ten vessels under the action of gravity. The unlocking operation is carried out by slackening-off the screw 52 and the turntable 50 is removed by means of the handles 60. It then only remains to place the end-caps 13 on the vessels prior to electronic beam welding.

It is readily apparent that the present invention has been described in the foregoing solely by way of explanation but not in any limiting sense and that any detail modifications can accordingly be contemplated without thereby departing from the scope or the spirit of the invention.

In particular, although the method and apparatus according to the invention have been described in the case of fabrication of plutonium alloy sources which are intended to be employed in heart pacemakers, it is wholly apparent that they could also be employed if necessary for other encapsulation operations.

What we claim is:

1. A method of semi-automatic encapsulation of pellets and deflecting spacer screens within vessels for heart pace-makers, wherein said method consists of a first stage, arranging in line on a movable track and in alternate sequence a predetermined number of vessels and a corresponding number of slots of said track with a constant angular interval between any one vessel and an adjacent slot, then displacing the line of vessels and slots in step-by-step motion above a loading magazine which contains the pellets, successively withdrawing and lifting a pellet above said track by means of a movable sucking tube as a slot passes above the loading magazine, lowering the sucking tube and cutting-off the suction above the vessel which immediately follows the slot so that the withdrawn pellet falls to the bottom of the vessel and so on in sequence in the case of the different vessels; and a second stage, positioning on the first track which has been secured against rotation a second track adapted to support the deflecting spacer screens within holes which are obturated by a diaphragm and spaced at the same angular intervals as the vessels on the first track, the position of the two tracks being such that each deflecting spacer screen is located vertically above a vessel and said deflecting spacer screens can thus be encapsulated simultaneously within the different vessels by manual control of the diaphragm opening.

2. A semi-automatic apparatus for encapsulation of pellets wherein said apparatus essentially comprises two circular turntables, namely a first turntable which is capable of rotating about its axis and constitutes a movable track, slots in said first turntable being notches of substantial depth uniformly spaced on the periphery of said turntable, a vertically movable sucking tube, the movement of the turntable and the movement of the vertically movable sucking tube being synchronized by drive means including an eccentric which drives a vertical arm mounting the sucking tube, a pin fixed on each radius of the turntable, a vessel at the end of each radius and said pin being adapted to initiate closure of a suction obturator which accompanies the sucking tube during the upward movements thereof, and a second turntable constituting a second track which is positioned axially on the first turntable and fixed thereon by means of a locking system, a circular diaphragm on said second turntable capable of pivotal motion to an open position, a displaceable radial operating lever for moving said diaphragm and a return spring for said lever.

3. An apparatus according to claim 2, including a motor for said drive means, said motor and said drive means being contained within a cylindrical casing covered by a mounting-plate which supports the turntables, the loading magazine which contains the pellets and the suction system.

4. An apparatus according to claim 3, wherein said drive means includes a horizontal shaft, a crank and crank-arm which perform the function of eccentric so as to impart reciprocating motion to a connecting-arm which slides vertically through an opening formed in the mounting-plate.

5. An apparatus according to claim 4, wherein the connecting-arm is slidably mounted within a vertical bracket which rests on the mounting-plate and wherein said connecting-arm terminates in a cantilevered supporting-arm traversed by a vertical suction tube with an obturator having an operating stem actuated by a wheel which is thrust back by the pins of the first turntable.

6. An apparatus according to claim 5, wherein the base of the vertical bracket which is fixed on the mounting-plate is fitted with a slide by means of a dovetail assembly, said slide being intended to contain the pellet loading magazine.

7. An apparatus according to claim 6, wherein the slide is fixed in position by means of a vertical spring-loaded stud which extends through the mounting-plate and in this position permits operation of the apparatus by action on a switch.

8. An apparatus according to claim 5, wherein the sucking tube moves downwards within the loading magazine to a level which is automatically adjusted by means of a spring loaded compensating device mounted on a rod which forms an extension of the connecting-arm, the spring being interposed between the sucking-tube support and the upper extremity of said rod.

9. An apparatus according to claim 2, wherein the two turntables are placed one above the other and on the common shaft thereof by means of a key along a generator-line of said shaft and wherein said turntables are interlocked at the edges thereof by means of a screw-type latch.

10. An apparatus according to claim 2, wherein said apparatus permits the production of ten encapsulated vessels in a single operation.

* * * * *